(12) United States Patent
Junker

(10) Patent No.: US 12,533,585 B2
(45) Date of Patent: Jan. 27, 2026

(54) GAMING DEVICE FOR A VEHICLE, VEHICLE AND METHOD FOR OPERATING A GAMING DEVICE FOR A VEHICLE

(71) Applicant: Ford Global Technologies, LLC, Dearborn, MI (US)

(72) Inventor: Lars Junker, Cologne (DE)

(*) Notice: Subject to any disclaimer, the term of this patent is extended or adjusted under 35 U.S.C. 154(b) by 296 days.

(21) Appl. No.: 18/458,878

(22) Filed: Aug. 30, 2023

(65) Prior Publication Data

US 2024/0075386 A1    Mar. 7, 2024

(30) Foreign Application Priority Data

Sep. 6, 2022   (DE) .......................... 102022122540.2

(51) Int. Cl.
| | | |
|---|---|---|
| *A63F 13/25* | (2014.01) | |
| *A63F 13/48* | (2014.01) | |
| *A63F 13/533* | (2014.01) | |
| *A63F 13/63* | (2014.01) | |
| *B60Q 1/00* | (2006.01) | |
| *B62D 1/04* | (2006.01) | |
| *G06Q 10/10* | (2023.01) | |
| *G09B 5/02* | (2006.01) | |
| *G09B 19/00* | (2006.01) | |

(52) U.S. Cl.
CPC ............ *A63F 13/533* (2014.09); *A63F 13/25* (2014.09); *A63F 13/48* (2014.09); *A63F 13/63* (2014.09); *B60Q 1/0017* (2013.01); *B62D 1/046* (2013.01)

(58) Field of Classification Search
CPC ........ A63F 13/245; A63F 13/25; A63F 13/48; A63F 13/803; A63F 13/90; B60Q 1/0017; B60Q 2400/50
See application file for complete search history.

(56) References Cited

U.S. PATENT DOCUMENTS

2023/0236320 A1*  7/2023  Krause ................... G01S 17/46
                                                                    348/46

FOREIGN PATENT DOCUMENTS

| DE | 102013012891 | A1 | 2/2015 | |
|---|---|---|---|---|
| DE | 102018218038 | A1 | 4/2020 | |
| DE | 102020104499 | A1 | 8/2021 | |
| DE | 102021111021 | B3 | 5/2022 | |
| EP | 3621012 | A1 * | 11/2020 | ............. A63F 13/25 |

* cited by examiner

*Primary Examiner* — Lawrence S Galka
(74) *Attorney, Agent, or Firm* — Christopher Storms; Eversheds Sutherland (US) LLP

(57) ABSTRACT

A gaming device is provided for a vehicle. It contains a control device which is set up to run a computer game in a game mode, in which output image signals are determined based on input signals for influencing the gameplay of the computer game received from a user. It also includes a user interface connected to the control device which is set up to receive the input signals from the user and an output device on board the vehicle connected to the control device which is set up to output the output image signals to an external area of the vehicle. It is provided that the user interface is located in a vehicle interior of the vehicle and can be operated by a person in the vehicle interior as a user and that the output device includes at least one high-resolution vehicle headlamp of the vehicle.

21 Claims, 3 Drawing Sheets

GAMING DEVICE FOR A VEHICLE, VEHICLE AND METHOD FOR OPERATING A GAMING DEVICE FOR A VEHICLE

CROSS-REFERENCE TO RELATED APPLICATIONS

The applications claims priority to and the benefit of German Application No. 102022122540.2, filed Sep. 6, 2022, which is hereby incorporated by reference herein in its entirety.

FIELD OF THE INVENTION

The present invention relates to a gaming device for a vehicle, a vehicle with a gaming device, a method for operating a gaming device for a vehicle, a computer program product and a computer-readable data carrier.

BACKGROUND

Drivers or other passengers of a vehicle often spend a lot of time in a vehicle, while driving, i.e. when the vehicle is in a driving mode, but also in other situations where the vehicle is not moving, for example when the vehicle is in a parking state, for example when a driver or passenger in the vehicle is waiting for another person or an event, or when a down time or rest period must be observed. Such times are often used to play a computer game and to relax.

A passenger of a vehicle may, for example, bring on board the vehicle a portable computer, a smartphone or other suitable mobile terminal device with a screen and a processor and computer game software suitable for running a computer game in order to play a computer game. For self-driving vehicles, DE 10 2017 205 079 A1 presents an entertainment device with which the passenger, who no longer has to deal with the control of the vehicle as a driver, can be provided with a screen output for his entertainment at different positions in a vehicle interior, i.e. a passenger cabin of the vehicle, which he deems suitable for relaxed entertainment. DE 10 2021 110 486 A1 explains a gaming system that provides for a representation in the vehicle interior of a self-driving vehicle while the vehicle is moving and aims to provide an immersive experience for the passenger playing the game by incorporating screen displays and audio output in the vehicle interior and also adapting them depending on parameters of the environment currently being driven through. DE 10 2020 108 986 A1 explains that a driver of a vehicle who wants to display and operate a computer game in the interior of the vehicle can use a user interface of the vehicle otherwise intended for another vehicle function, wherein it must first be detected whether the driver wants to use the interface to operate the computer game or the other vehicle function.

These ways of using a computer game on board a vehicle are based on the assumption that the passenger who wants to play can and wants to focus their attention away from the vehicle's surroundings to a screen display in the interior of the vehicle. In addition, the ability of other passengers to follow the gameplay as spectators is severely limited, because depending on the vehicle, screen displays already installed in the vehicle interior can be small and, above all, designed for viewing by a single user, for example the driver.

The object of the present invention is to provide a simple way of playing a computer game on board a vehicle, which nevertheless allows the surroundings of the vehicle to be kept in view and which enables other passengers to follow the gameplay.

According to the invention, this object is achieved with a gaming device for a vehicle according to claim 1, a vehicle having a gaming device according to claim 13 and a method for operating a gaming device for a vehicle according to claim 14, a computer program product according to claim 17 and a computer-readable medium according to claim 18. Advantageous developments of the invention are given in the dependent claims.

According to a first aspect of the invention, a gaming device for a vehicle, i.e. on board a vehicle, contains, on the one hand, a control device set up to run a computer game in a game mode, in which output image signals are determined based on input signals received from a user for influencing a gameplay of the computer game. On the other hand, the gaming device contains a user interface connected to the control device which is set up to receive the input signals from the user and an output device on board the vehicle connected to the control device which is set up to transmit the output image signals to an external area, i.e. an environment, of the vehicle. It is provided that the user interface is located in a vehicle interior of the vehicle and can be operated by a person in the vehicle interior, i.e. a passenger, such as a driver, of the vehicle as a user, and that the output device contains at least one high-resolution vehicle headlamp of the vehicle.

A vehicle is in particular a motor vehicle, such as a passenger car, a lorry or a bus, but may also be any other road, rail, water or air vehicle, provided that it has at least one vehicle headlamp to illuminate the vehicle's path of motion.

Vehicle headlamps are headlamps on board a vehicle. They are part of the vehicle lighting and are used in particular to illuminate the road ahead, i.e. the roadway, in particular the road to be driven in the case of a motor vehicle. In a preferred embodiment, vehicle headlamps are driving lights or headlamps of the vehicle. Vehicle headlamps preferably illuminate the external space in front of the vehicle in particular. In a further embodiment, vehicle headlamps may also be other headlamps of the vehicle, for example fog lamps or additionally arranged headlamps on the vehicle, in the case of a motor vehicle, for example in the area of the radiator grille, a windshield or on the roof of the motor vehicle. In yet another embodiment, the output device contains, in addition to or as an alternative to at least one high-resolution vehicle headlamp, a projection device, in the case of a motor vehicle, for example, in the area of the radiator grille, a windshield or on the roof of the motor vehicle, which is used to output the output image signals to the external space of the vehicle, preferably the external space in front of the vehicle, without illumination function of the external space being provided for the projection device when driving.

In the case of high-resolution vehicle headlamps, a large number of segments of the headlamp acting as individual lighting elements can be controlled separately. This allows, for example, an adjustment of the light distribution while driving. High-resolution vehicle headlamps, for example, use a matrix structure consisting of many individual light sources as lighting elements, i.e. light sources. In other technologies, for example, areas of a single light source that can be activated or obscured separately act as lighting elements of a high-resolution vehicle headlamp.

Depending on the user interface used, input signals from the user can be press switch or rotary switch actuations for example, but also voice inputs for example. In particular, output image signals can also describe image sequences to be output, i.e. video sequences, which also represent movements in the computer gameplay.

The output device may contain, in addition to or as part of the at least one high-resolution vehicle headlamp, a control unit or a driver unit to adapt the output image signals determined by the control device of the gaming device for output via the vehicle headlamp(s).

The control device contains at least one processor and a memory in which program code is stored for the execution of a computer game algorithm which, when loaded into the at least one processor, causes it to execute the computer game algorithm. When a computer game, i.e. a computer game algorithm, is executed, the control device is in the game mode. Even in this operating state, it may be provided that the control device can also perform other functions, for example for controlling vehicle functions. In this context, a vehicle function is understood to mean any function of the vehicle that relates to the driving mode or any other function of the vehicle other than the computer game functions.

High-resolution vehicle headlamps offer the technical possibility not only to illuminate the vehicle's path of motion, i.e. the roadway, but also to project information into an external area, i.e. an environment, of the vehicle in suitable situations.

It is true that DE 10 2018 218 038 A1 describes that the controllability of the matrix elements, i.e. the many individual light sources, can also be used to display an infographic or pictograms on a projection surface. And in DE 10 2020 130 473 B3 it is explained that an image with symbols or legible letters can also be projected onto a projection surface from such a vehicle headlamp, wherein it is provided to display the illustration in the most correct perspective possible for the given viewer. In DE 102021 111 021 B3 it is also proposed to measure and adjust brightness gradients in an image projected in this way if the brightness distribution in the projected image deviates too much from that in the image to be projected. In addition, it is known from DE 10 2018 109 144 A1 that a video projector can be arranged on a tailgate of a motor vehicle that can project a video in a direction away from the vehicle when the tailgate is open. The video projector can be a taillight.

However, displaying the course of an interactive computer game over time as a moving image sequence in an external area of the vehicle in a live manner using the at least one vehicle headlamp goes beyond the static display of symbols, letters or images, and the interaction of the components of the presented gaming device for a vehicle offers a combination of advantages at the same time. Thus, it allows an eye-friendly, large-scale display of the gameplay, which can be followed not only by the player but also by one or more other passengers (typically by using a windshield in the case of a motor vehicle) and possibly even by persons outside the vehicle, while at the same time there is also the possibility of perceiving events in the external area of the vehicle and reacting to expected and unexpected external events and, for example, to quickly terminate the game mode if necessary. At the same time, the game can be played by the playing passenger in an ergonomic position or posture of the passenger, without the need for adjustments to the vehicle interior, because the seats in a vehicle interior, in particular the driver's seat, are designed to be able to observe the external area of the vehicle in an ergonomically suitable, comfortable position during the driving mode, whereas games displayed in the vehicle interior may require a deviation from the most ergonomically appropriate posture, which is less conducive to the passenger's relaxation during play, unless an elaborate change in the orientation of the passenger seat is provided.

The gaming device can preferably be provided based only on components already present in the vehicle without changes to the layout of the vehicle.

In one embodiment, the user interface contains at least one vehicle input device that can be used to receive input signals for influencing at least one vehicle function when the control device is not in the game mode. In the case of a motor vehicle, a large number of input devices are available, especially within reach of the person in the driver's seat, which can be used to control one of the vehicle's functions, such as the steering wheel and buttons, i.e. pressure switches, and levers on the steering wheel or steering column, buttons on the dashboard, door panel, pedals and, where appropriate, the gear lever. Which input devices are suitable for an input for controlling a computer game during the computer game mode of the control device depends on the operating state in which the vehicle must be while the control device is in the computer game mode, in particular in the case of a motor vehicle whether it is at a standstill or in a parked state or whether movement is to be permitted. The use of an input device that otherwise operates a vehicle function when the control device is not in the computer game mode offers the advantage that it does not require a change to the vehicle interior in order to install a suitable input device, nor does the passenger have to bring an input device on board, which would then also have to be connectable to the control device via a data interface.

In an exemplary embodiment of the gaming device, the at least one input device of the vehicle contains at least one switch on a steering wheel device of the vehicle. The steering wheel device includes, for example, in particular the steering wheel and the steering column in the case of a motor vehicle, for example a passenger car, a lorry or a bus. Switches on the steering wheel are, for example, press switches, rotary switches, but also toggle switches or levers, for example a turn signal lever, horn, windshield wiper lever, etc. If the person in the driver's seat of the vehicle is also the player of the computer game, these are usually arranged in an ergonomically favorable, easily accessible position, so that relaxed operation of the game is possible.

For example, the computer game may be a block rotation game. For example, in the case of a motor vehicle, the ACC buttons, i.e. buttons used to operate adaptive cruise control (ACC) when in the driving mode, may be used as an input device in a motor vehicle, wherein, while the control device is in computer game mode, they may be set up to move or rotate a block moving from top to bottom through the playing field to the left or right in the game. These input signals are then processed by the control device and a continuous video sequence is generated, which is output by at the least one high-resolution vehicle headlamp, if necessary after adaptation to the technical parameters, in particular the resolution, of the at least one vehicle headlamp.

In a preferred embodiment of the gaming device for a vehicle, the control device is an electronic control unit of the vehicle. The control device is an electronic control unit (ECU), i.e. it contains at least one microprocessor or microcontroller or, in the case of a plurality of electronic control units of the vehicle, it is at least one of the control units which is set up to control at least one vehicle function at least when it is not in the computer game mode. For example, it is not necessary to bring a computer with a processor on board the vehicle in order to run the computer game. The control device also contains or is connected to or can be connected to a memory in which code portions, i.e. program code of the computer game, are stored, which can be loaded and executed by the control device. The gaming device, including the user interface, output device and control device, can preferably be implemented in entirely with components provided for the operation of the vehicle.

In another preferred embodiment, the output device contains another high-resolution vehicle headlamp of the vehicle. In other words, the output device includes at least two high-resolution vehicle headlamps, for example a left and a right vehicle headlamp. This enables improved projection of the output image signals.

In a preferred exemplary embodiment, the control device then contains an arbitration module that is set up to assign the output image signals to the high-resolution vehicle headlamp and/or to the other high-resolution vehicle headlamp. In this way, the output image signals can be output to a larger projection surface and/or with a greater brightness and more uniform brightness distribution. For example, depending on the mode set by the user, the left or the right high-resolution vehicle headlamp or both high-resolution vehicle headlamps can be used for the display. If multiple vehicle headlamps are used, the arbitration module ensures that synchronization occurs so that the two displayed image signal outputs overlap exactly. In a particular embodiment, the image signal output is divided in such a way that each of the high-resolution vehicle headlamps outputs a portion that complements the other output portion.

In one embodiment of the gaming device, the control device is set up to adjust the output image signals depending on an operating mode of the at least one high-resolution vehicle headlamp. For example, especially in motor vehicles, the vehicle headlamp(s) can usually be operated in a low beam mode and a high beam mode. In the low beam mode, for example, the computer game is projected onto the road ahead or parking lot. Preferably, the control device is set up to adjust the perspective for the driver or passenger of the vehicle playing the game, depending on the game, in order to compensate for a perspective distortion or to use it to optimize the display. The high beam mode can be used for game display in particular if a suitable, preferably almost vertical, surface is available in the area illuminated by the vehicle headlamps, for example a wall or a building wall. This is particularly suitable for distortion-free projection. In a particularly preferred embodiment, the gaming device also contains a camera which records camera images of the roadway and wherein the control device contains an image recognition module with which a suitable projection surface is automatically identified and the control device is set up to control the at least one high-resolution vehicle headlamp in such a way, for example by generating suitable output image signals, that the computer game is displayed in the identified area. In one embodiment, it is provided to evaluate signals from one or more further environment sensors of the vehicle, in the case of a motor vehicle, for example, radar or ultrasonic sensors, in order to improve the automatic identification of the appropriate projection surface and/or the control of the high-resolution vehicle headlamp.

Even if the user interface preferably provides one or more input devices of the vehicle itself, it may be provided in a further embodiment that the user interface of the gaming device additionally or alternatively includes a mobile terminal device. In particular, input via a smartphone, touchpad or similar may be provided, which can be connected to the control device, for example wirelessly. This can be advantageous, for example, if a passenger other than the passenger in the driver's seat wants to play the computer game, but the vehicle's input devices provided for this purpose can only be conveniently operated from the driver's seat, or if the vehicle is a self-driving vehicle without suitable input devices in the vehicle interior.

In one embodiment of the gaming device, at least one high-resolution vehicle headlamp has a plurality of lighting elements for the targeted generation of a light distribution according to received output image signals. The same preferably applies to the other high-resolution vehicle headlamp.

The individual lighting elements can be controlled either directly by the control device or with the help of a control unit, for example as part of the respective vehicle headlamp, which converts the output image signals received from the control device into control signals for the individual lighting elements.

In one exemplary embodiment, the lighting elements are in the form of light-emitting diodes or of components of a liquid crystal display device or of components of a digital micromirror device. Other matrix-shaped lighting elements can also be used. A high-resolution vehicle headlamp includes multiple lighting elements, usually more than 100, preferably more than 1000. In one embodiment, the at least one high-resolution vehicle headlamp may have one million or more lighting elements so that the gameplay can be displayed at a particularly high resolution.

In a further embodiment, the at least one high-resolution vehicle headlamp has a light source and a shading device with which a plurality of areas or segments of the light source can be shaded separately and thus act as separately controllable lighting elements.

In yet another embodiment, a light source of at least one high-resolution vehicle headlamp has separately activatable areas or segments that act as separately controllable lighting elements.

It may be provided to emit only essentially white light, for example in order to comply with legal requirements for the operation of vehicle headlamps in road traffic. However, in one embodiment, it may also be provided to output light in other colors when the control device is in the computer game mode.

In one embodiment of the gaming device, the control device is set up to detect a motion state of the vehicle and to switch to the game mode depending on the detected motion state. In particular, it may be provided that it is only possible to switch to the game mode if a low maximum speed is not exceeded, for example walking speed, for example 5 km/h. It may also be envisaged that one or more environmental parameters will also be detected and taken into account, such as current brightness and/or impaired visibility due to fog or rain.

In a preferred exemplary embodiment, the control device is set up to be able to change to game mode only when the vehicle is not moving. Preferably, the vehicle is in a parking state. Thus it is ensured even without additional checks that neither the vehicle headlamp(s) nor any of the input devices are currently required for safe driving of the vehicle or other requirements, for example the activation of the high beam, and that use for the gaming device is possible. In one embodiment, it is intended to determine an operating state of the vehicle, for example the parking state in which the control device can switch to the game mode, on the basis of at least one vehicle state parameter, for example, a current ignition position.

According to a second aspect of the invention, a vehicle includes a gaming device according to the first aspect of the invention.

According to a third aspect of the invention, a method for operating a gaming device for a vehicle according to the first aspect of the invention, wherein the gaming device has a control device, a user interface in a vehicle interior and an output device containing at least one high-resolution vehicle headlamp on board the vehicle, includes the following steps:

Changing the control device to a game mode;
Setting up the control device to run a computer game in which output image signals are obtained based on input signals received from a user through the user interface for influencing the gameplay of the computer game,
Running the computer game,
Receiving input signals of the user through the user interface in the vehicle interior,
Determining output image signals by the control device according to the input signals, and
Outputting output image signals by the output device to an external area of the vehicle.

In one embodiment of the method, the step of changing the control device to a game mode involves detecting a motion state of the vehicle and changing to the game mode depending on the detected motion state.

In an exemplary embodiment of the method, changing to the game mode can only take place when the vehicle is not moving.

In yet another embodiment, the step of changing the control device to a game mode involves detecting an operating state of the vehicle, such as the parking state, on the basis of at least one vehicle state parameter, such as a current ignition position, and changing to the game mode depending on the detected operating state.

According to a fourth aspect of the invention, a computer program product contains code portions which, when executed by a control device of a gaming device for a vehicle according to the first aspect of the invention, cause the gaming device to carry out a process according to the third aspect of the invention. In this case, the code portions, i.e. the program code, of the computer program product correspond to a computer program containing commands by which the gaming device is induced to perform steps of the method. The control device includes at least one processor and one memory.

According to a fifth aspect of the invention, a computer-readable medium comprises a computer program product according to the fourth aspect of the invention. A computer-readable data carrier can be both a computer-readable storage medium and a data carrier signal. A computer-readable storage medium is a medium suitable for storing software, such as a CD-ROM, DVD, Blu-ray disc, USB flash drive, hard drive, etc. A data carrier signal enables wired or wireless transmission of the code portions.

Thus, the advantages and special features of the gaming device according to the invention for a vehicle, including its embodiments, are also implemented in the context of a vehicle with such a gaming device and a method for operating a gaming device for a vehicle as well as a computer program product and a computer-readable data carrier.

BRIEF DESCRIPTION OF THE DRAWINGS

Further advantages of the present invention can be seen from the detailed description and illustrations. The invention is also explained in more detail below in connection with the following description of exemplary embodiments with reference to the accompanying figures. In the figures.

DETAILED DESCRIPTION

It is understood that other embodiments may be used and structural or logical changes may be made without deviating from the scope of protection of the present invention. It is understood that the characteristics of the various exemplary embodiments described above and below may be combined with each other, unless specifically stated otherwise. The description is therefore not to be understood in a restrictive sense, and the scope of protection of the present invention is defined by the appended claims.

Figure 1:
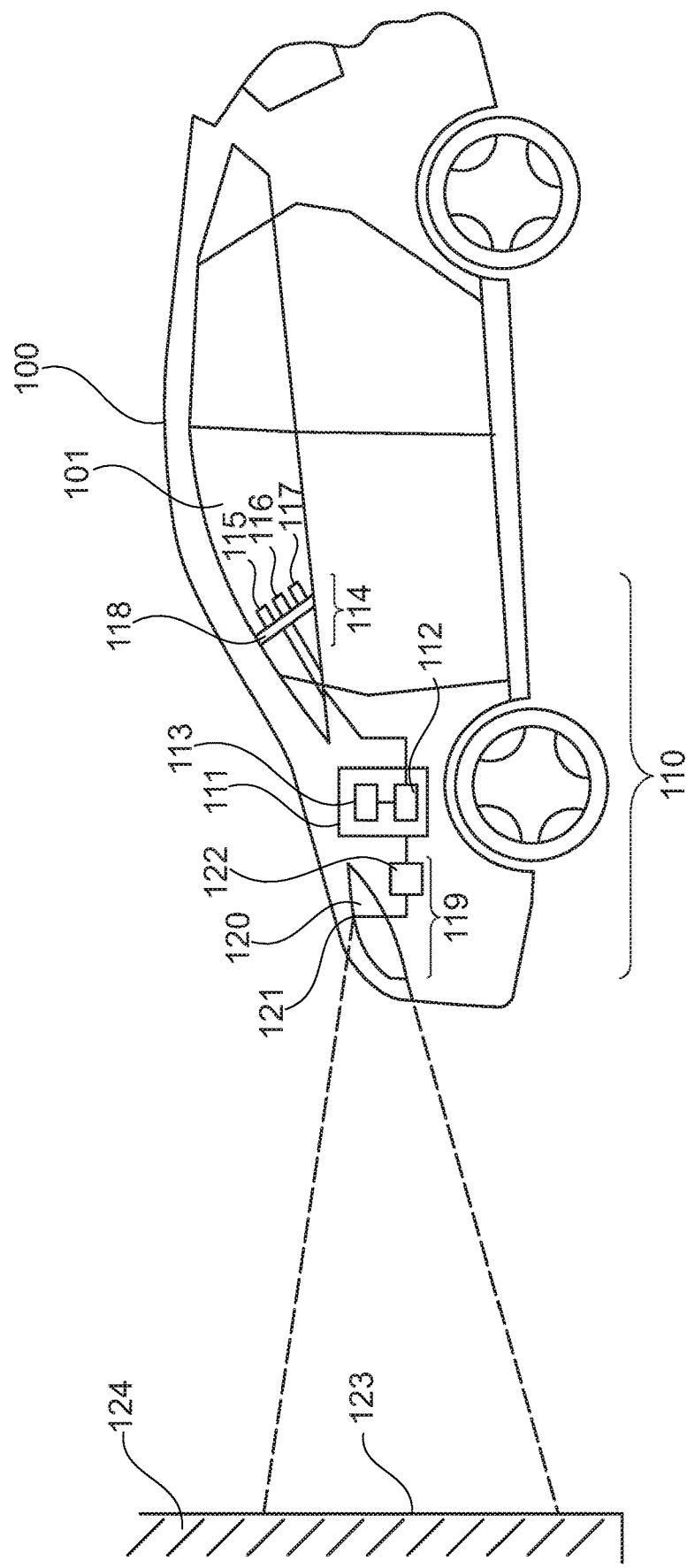
FIG. 1 shows a schematic representation of an example of a vehicle with a gaming device according to an embodiment of the invention.

In FIG. 1, a schematic representation of an example of a vehicle 100 with a gaming device 110 according to an embodiment of the invention is shown. The vehicle 100 has a vehicle interior 101. The gaming device 110 has a control device 111 which is set up to run a computer game in a game mode. For this purpose, the control device 111 has a memory 112 in which a computer program product containing the computer game is stored, which can be loaded and executed by a processor 113 of the control device 111. Output image signals are determined based on input signals for influencing the course of the computer game received from a user, such as the driver of vehicle 100. In order to receive the input signals, the control device 111 is connected to a user interface 114 which is set up to receive the input signals from the user. In the case shown in FIG. 1, the user interface 114 has three switches 115, 116 117 as input devices on the steering wheel device 118 of the vehicle 100. The switches can be, for example, pushbutton switches or press switches. Depending on the requirements of the computer game being played, the user interface 114 may also include more or fewer input devices.

An output device 119 containing a high-resolution vehicle headlamp 120 is also connected to the control device 111. This has a matrix 121 with a large number of individually controllable lighting elements, such as micro-LEDs. The output device 119 also comprises a headlamp control unit 122 for adjusting the high-resolution vehicle headlamp 120 based on the output image signals generated by the control device 111 adapted to the resolution and/or operating mode (low beam or high beam mode) of the vehicle headlamp 120. The vehicle 100 also has another high-resolution vehicle headlamp (not shown) as part of the output device 119 on board the vehicle 100, which is set up to output the output image signals to an external area of the vehicle 100. In FIG. 1 it is envisaged that the high-resolution vehicle headlamp 120 is operated in the high beam mode and that an area of a wall 123 serves as a vertical projection surface for the output image signals.

Figure 2:
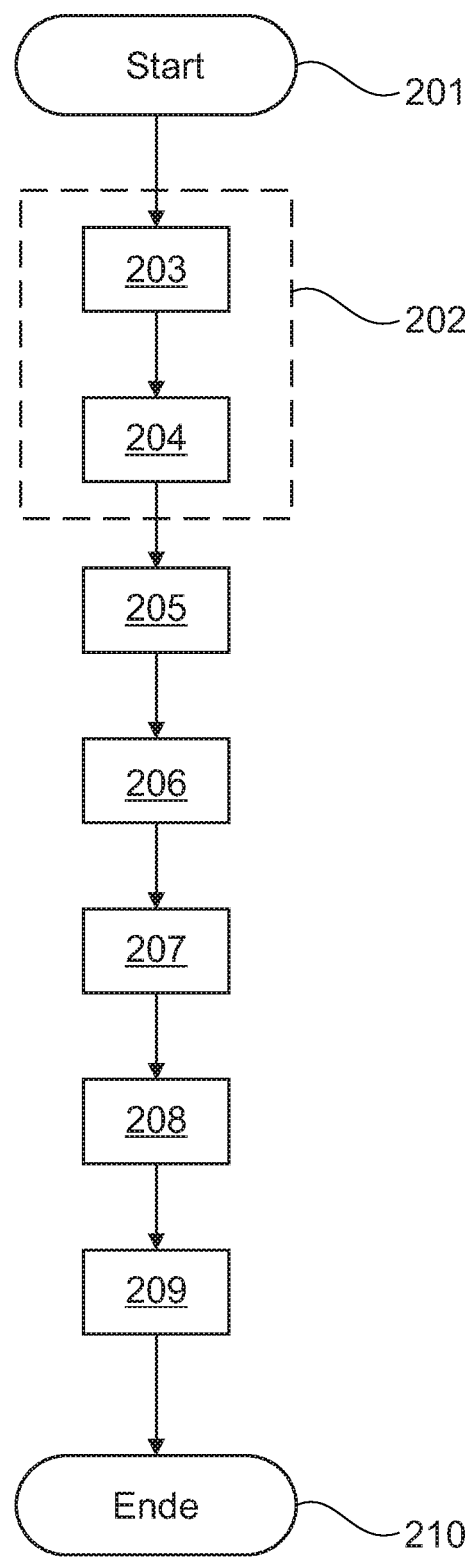
FIG. 2 shows a schematic representation of an example of a method for operating a gaming device for a vehicle according to another embodiment of the invention.

In FIG. 2 a schematic representation of an example of a method for operating a gaming device for a vehicle according to a further embodiment of the invention is shown. The method 200 for operating a gaming device for a vehicle containing a control device, a user interface in a vehicle interior and an output device comprising at least one high-resolution vehicle headlamp on board the vehicle begins in a starting state 201 in which a passenger on board indicates that he or she wishes to play a computer game, for example by making an appropriate menu selection on a display of the on-board computer in the vehicle interior that a computer game is to be started, if appropriate also which one, if there are several to choose from.

In a first step the control device 202 is changed to a game mode. In the case shown in FIG. 2 the step of changing the control device 202 to a game mode includes first detecting a motion state of the vehicle 203 and changing to the game mode 204 depending on the detected motion state, wherein in the embodiment described, this means that the change to the game mode occurs only when the vehicle is not moving. Otherwise, the method ends here. Depending on the embodiment, the detected motion state may be a sufficient, i.e. adequate, or necessary condition for the control device to switch to the game mode. If it is a necessary condition, it may be necessary that one or more other conditions must also be met.

If the vehicle is not moving, i.e. the prerequisite for changing to the game mode is met, the next step is to set up 205 the control device to run the computer game, in which output image signals are then determined based on input signals received from the user, i.e. the passenger who wants to play, for influencing the gameplay in the computer game.

The next step is to run 206 the computer game. Running the computer game, i.e. the computer game algorithm, will continue during the following steps. In the further steps, the user's input signals are received 207 in the vehicle interior via the user interface, output image signals are determined 208 by the control device according to the input signals, and output image signals are output 209 to an external area of the vehicle by the output device, i.e. the output image signals are projected by the at least one high-resolution vehicle headlamp.

The method ends in a final state 210 when the passenger finishes the game or the requirement for the game mode, in this case: standstill of the vehicle, is no longer met.

The steps of the method are shown in FIG. 2 in a sequential order. Since playing the computer game is an interactive process in which the playing passenger reacts with his input signals to the displayed output image signals and these in turn depend on the input signals, it is understood that the procedural steps, in particular steps 206-209, although described according to a certain orderly sequence, are partly carried out in a different order than the one described here, in particular at the same time or consecutively, single or multiple times.

Figure 3:
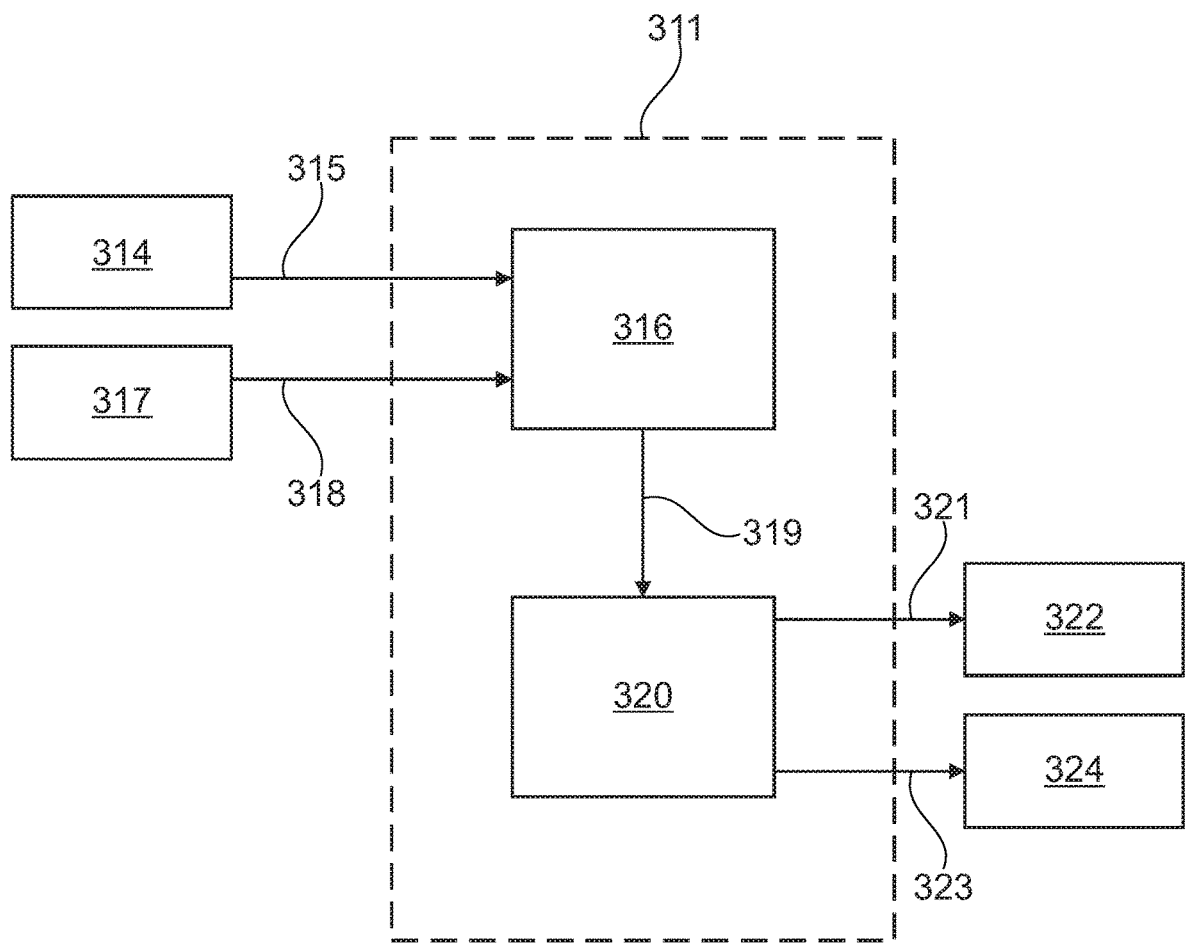
FIG. 3 shows a schematic representation of an example of a gaming device for a vehicle according to yet another embodiment of the invention.

In FIG. 3 a schematic representation of an example of a gaming device 310 for a vehicle is provided according to yet another embodiment of the invention. The vehicle here is a motor vehicle, for example a passenger car, in which the signal transmission between components takes place via a CAN bus or other fieldbus.

On the input side, the gaming device 310 has a user interface 314 which has, for example, switches on the steering wheel of the vehicle by means of which input signals from the user, i.e. the playing passenger, are received and are passed via the CAN bus 315 of the vehicle to a computer game module 316, i.e. a computer game algorithm, which is executed by a control device 311 of the vehicle, which is thus the control device of the gaming device 310 of the vehicle. In addition, the gaming device 310 has a data interface 317 to the vehicle on the input side, via which parameters of the vehicle state, in particular of the motion state of the vehicle, of environmental conditions detected by vehicle sensors, such as the ambient brightness, and, for example, an activation message to switch to the game mode, are received, which are also passed via the CAN bus 318 of the vehicle to the computer game module 316 of the control device 311.

The computer game module 316 determines the output image signals 319, i.e. image data for a continuous sequence of images to be output, which reflect the gameplay, and transfers them to an arbitration module 320, which in FIG. 3 is also executed by the control device 311. The arbitration module 320 then makes an adjustment to or assignment to one of the high-resolution vehicle headlamps of the vehicle for the individual pixels of the respective image to be displayed and transmits the image data signals of the output image signals for the left high-resolution vehicle headlamp 321 for output to the left high-resolution vehicle headlamp 322, wherein this has a (not shown) control or driver unit for adapting the image data signals to the vehicle headlamps. The arbitration module 320 transmits the image data signals of the output image signals for the right high-resolution vehicle headlamp 323 for output to the right high-resolution vehicle headlamp 324, which also has a control or driver unit for adapting the image data signals to the vehicle headlamp.

The expression "and/or" used in the description when used in a series of two or more elements means that each of the listed elements can be used alone or can be used in any combination of two or more of the listed elements. If, for example, a composition containing components A, B and/or C is described, the composition may contain A alone; B alone; C alone; A and B in combination; A and C in combination; B and C in combination; or A, B, and C in combination.

REFERENCE SIGN LIST

100 Vehicle
101 Vehicle interior
110 Gaming device
111 Control device
112 Memory
113 Processor
114 User Interface
115 Switch
116 Switch
117 Switch
118 Steering wheel device
119 Output device
120 High-resolution vehicle headlamp
121 Matrix with a large number of individually controllable lighting elements
122 Headlamp control unit
123 Wall
200 Method for operating a gaming device for a vehicle
201 Starting state
202 Changing the control device to a game mode
203 Detecting the vehicle's motion state
204 Changing to the game mode according to the detected motion state
205 Setting up the control device to run the computer game
206 Running the computer game
207 Receiving user input signals
208 Determining output image signals according to the input signals
209 Outputting output image signals to the exterior of the vehicle
210 Final state
310 Gaming device for a vehicle
311 Control device 314 User Interface
315 CAN bus
316 Computer game module
317 Data interface
318 CAN bus
319 Output image signals
320 Arbitration module
321 Image data signals for left high-resolution vehicle headlamp
322 Left high-resolution vehicle headlamp
323 Image data signals for right high-resolution vehicle headlamp
324 Right high-resolution vehicle headlamp

What is claimed is:

1. A gaming device for a vehicle, comprising
a control device which is set up to run a computer game in a game mode, in which output image signals are determined based on input signals received from a user for influencing a gameplay of the computer game;
a user interface connected to the control device which is set up to receive the input signals from the user; and
an output device on board the vehicle connected to the control device which is set up to output the output image signals to an external area of the vehicle, wherein
the user interface is located in a vehicle interior of the vehicle and can be operated by a person in the vehicle interior as a user, and
the output device contains at least one high-resolution vehicle headlamp of the vehicle,
wherein the user interface includes at least one input device of the vehicle with which the input signals for influencing at least one vehicle function can be received when the control device is not in the game mode.

2. The gaming device according to claim 1, wherein the at least one input device of the vehicle includes at least one switch on a steering wheel device of the vehicle.

3. The gaming device according to claim 1, wherein the control device is an electronic control unit of the vehicle.

4. The gaming device according to claim 1, wherein the output device includes another high-resolution vehicle headlamp of the vehicle.

5. The gaming device according to claim 4, wherein the control device includes an arbitration module which is set up to assign the output image signals to the high-resolution vehicle headlamp and/or to the other high-resolution vehicle headlamp.

6. The gaming device according to claim 1, wherein the control device is set up to adjust the output image signals according to an operating mode of the at least one vehicle headlamp.

7. The gaming device according to claim 1, wherein the user interface contains a mobile terminal device.

8. The gaming device according to claim 4, wherein the at least one high-resolution vehicle headlamp includes a plurality of lighting elements for the targeted generation of a light distribution according to received output image signals.

9. The gaming device according to claim 8, wherein the lighting elements are in the form of light-emitting diodes or of components of a liquid crystal display device or of components of a digital micromirror device.

10. The gaming device according to claim 1, wherein the control device is set up to detect a motion state of the vehicle and to switch to the game mode according to the detected motion state.

11. The gaming device according to claim 10, wherein the control device is set up to be able to switch to the gaming mode only when the vehicle is not moving.

12. A gaming device for a vehicle, comprising
a control device which is set up to run a computer game in a game mode, in which output image signals are determined based on input signals received from a user for influencing a gameplay of the computer game;
a user interface connected to the control device which is set up to receive the input signals from the user; and
an output device on board the vehicle connected to the control device which is set up to output the output image signals to an external area of the vehicle, wherein
the user interface is located in a vehicle interior of the vehicle and can be operated by a person in the vehicle interior as a user, and
the output device contains at least one high-resolution vehicle headlamp of the vehicle,
wherein the output device includes another high-resolution vehicle headlamp of the vehicle, and
wherein the control device includes an arbitration module which is set up to assign the output image signals to the high-resolution vehicle headlamp and/or to the other high-resolution vehicle headlamp.

13. The gaming device according to claim 12, wherein the user interface includes at least one input device of the vehicle with which the input signals for influencing at least one vehicle function can be received when the control device is not in the game mode.

14. The gaming device according to claim 13, wherein the at least one input device of the vehicle includes at least one switch on a steering wheel device of the vehicle.

15. The gaming device according to claim 12, wherein the control device is an electronic control unit of the vehicle.

16. The gaming device according to claim 12, wherein the control device is set up to adjust the output image signals according to an operating mode of the at least one vehicle headlamp.

17. The gaming device according to claim 12, wherein the user interface contains a mobile terminal device.

18. The gaming device according to claim 12, wherein the at least one high-resolution vehicle headlamp includes a plurality of lighting elements for the targeted generation of a light distribution according to received output image signals.

19. The gaming device according to claim 18, wherein the lighting elements are in the form of light-emitting diodes or of components of a liquid crystal display device or of components of a digital micromirror device.

20. The gaming device according to claim 12, wherein the control device is set up to detect a motion state of the vehicle and to switch to the game mode according to the detected motion state.

21. The gaming device according to claim 20, wherein the control device is set up to be able to switch to the gaming mode only when the vehicle is not moving.

* * * * *